(12) United States Patent
Graham et al.

(10) Patent No.: US 10,704,699 B2
(45) Date of Patent: Jul. 7, 2020

(54) VALVE APPARATUS, SYSTEM AND METHOD

(71) Applicant: Vortech Engineering, Inc., Oxnard, CA (US)

(72) Inventors: Gregory Graham, Ventura, CA (US); Michael Reagan, Newbury Park, CA (US)

(73) Assignee: Vortech Engineering, Inc., Oxnard, CA (US)

( * ) Notice: Subject to any disclaimer, the term of this patent is extended or adjusted under 35 U.S.C. 154(b) by 0 days.

(21) Appl. No.: 15/337,721

(22) Filed: Oct. 28, 2016

(65) Prior Publication Data

US 2018/0119830 A1 May 3, 2018

(51) Int. Cl.
*F16K 15/02* (2006.01)
*F16K 7/12* (2006.01)
*F16K 15/14* (2006.01)
*F16K 17/04* (2006.01)
*F16K 27/02* (2006.01)

(52) U.S. Cl.
CPC ............ *F16K 15/026* (2013.01); *F16K 7/12* (2013.01); *F16K 15/14* (2013.01); *F16K 17/04* (2013.01); *F16K 27/0236* (2013.01)

(58) Field of Classification Search
CPC ............ Y10T 137/7933; F16K 15/063; F16K 15/021; F16K 15/026
See application file for complete search history.

(56) References Cited

U.S. PATENT DOCUMENTS

| 767,878 | A | * | 4/1868 | Ashcroft | F16K 15/063 |
| | | | | | 137/543 |
| 81,863 | A | * | 9/1868 | Ashcroft | F16K 15/063 |
| | | | | | 137/543 |
| 157,050 | A | * | 11/1874 | Wiard | F16K 35/10 |
| | | | | | 137/382 |
| 666,245 | A | * | 1/1901 | Ginaca | F16K 15/063 |
| | | | | | 137/533.23 |
| 1,159,347 | A | * | 11/1915 | Angell | F16K 15/063 |
| | | | | | 137/533.29 |
| 3,131,718 | A | * | 5/1964 | Mingrone | F16K 17/02 |
| | | | | | 137/512.1 |
| 3,134,394 | A | * | 5/1964 | Ohta | F16K 15/06 |
| | | | | | 137/220 |
| 3,995,658 | A | * | 12/1976 | Hager | F16K 15/026 |
| | | | | | 137/543 |
| 4,540,457 | A | * | 9/1985 | LaValley | F16K 1/228 |
| | | | | | 156/182 |

(Continued)

*Primary Examiner* — Reinaldo Sanchez-Medina
*Assistant Examiner* — Nicole Gardner

(57) ABSTRACT

A valve apparatus and system is provided. The valve apparatus includes a housing having a fluid inlet and a fluid outlet. A support assembly is attached to the housing, the support assembly including a positioning chamber located over the outlet. A diaphragm assembly is moveably attached to the support assembly. The diaphragm assembly includes a piston having one end slideably mounted in the positioning chamber, and a diaphragm attached to the other end of the piston. A sealing element is located about a perimeter of the diaphragm, and a biasing element is arranged to contact the support assembly and the diaphragm assembly, thereby urging at least a portion of the sealing element against the fluid outlet, providing a fluid-tight seal.

11 Claims, 7 Drawing Sheets

(56) References Cited

U.S. PATENT DOCUMENTS

| | | | | |
|---|---|---|---|---|
| 5,148,828 A * | 9/1992 | Farnham | ............... | E03C 1/106 |
| | | | | 137/454.6 |
| 5,554,395 A * | 9/1996 | Hume | ................... | B29C 45/27 |
| | | | | 264/328.15 |
| 5,921,276 A * | 7/1999 | Lam | ..................... | F16K 15/026 |
| | | | | 137/220 |
| 6,340,031 B1 * | 1/2002 | Matsumoto | ........... | B60K 15/04 |
| | | | | 137/513.3 |
| 8,230,875 B2 * | 7/2012 | Norman | ............... | F16K 15/063 |
| | | | | 137/315.33 |

\* cited by examiner

VALVE APPARATUS, SYSTEM AND METHOD

FIELD OF THE INVENTION

The present invention relates generally to valves, and more particularly to check valves, pressure relief valves and other types of valves.

BACKGROUND OF THE INVENTION

At their most basic, a valve controls the flow of a fluid or gas. Valves are integral components in almost every gas or fluid system. There are many types of valves in use today. In the case of check valves, there are ball, dual plate or double-door, spring assisted, piston or lift, and swing checks. While no one type of valve is good for all applications, each has its advantages.

The pressure relief valve is a type of valve used to control or limit the pressure in a system. The pressure is relieved by allowing the pressurized fluid to flow through the valve out of the system. The relief valve is designed to open at a predetermined pressure to protect pressure vessels and other equipment from being subjected to pressures that exceed their design limits. When the set pressure is exceeded, the relief valve becomes the "path of least resistance" as the valve is forced open and the fluid or gas is allowed to escape. As the fluid or gas escapes, the pressure inside the vessel will decrease. Once it reaches the valve's reseating pressure, the valve will close.

However, in most systems that use moving parts, there are problems specific to the part. Common valve problems include noise, vibration, reverse flow, sticking, leakage, component wear, or damage. One of the most common problems with valves are reverse flow. Reverse flow can be costly, depending upon the system in which the valve is employed.

In addition, valves are subject to wear—whenever one part rubs against another part, wear is a result, which leads to leakage and eventual failure of one or more components. A component failure can result in the valve not performing its function, which in the case of a check valve is primarily to prevent reverse flow and in the case of a pressure relief valve, preventing vessel overpressure.

Therefore, there remains a need to overcome one or more of the limitations in the above-described, existing art. The discussion of the background to the invention included herein is included to explain the context of the invention. This is not to be taken as an admission that any of the material referred to was published, known or part of the common general knowledge as at the priority date of the claims.

Figure 1:
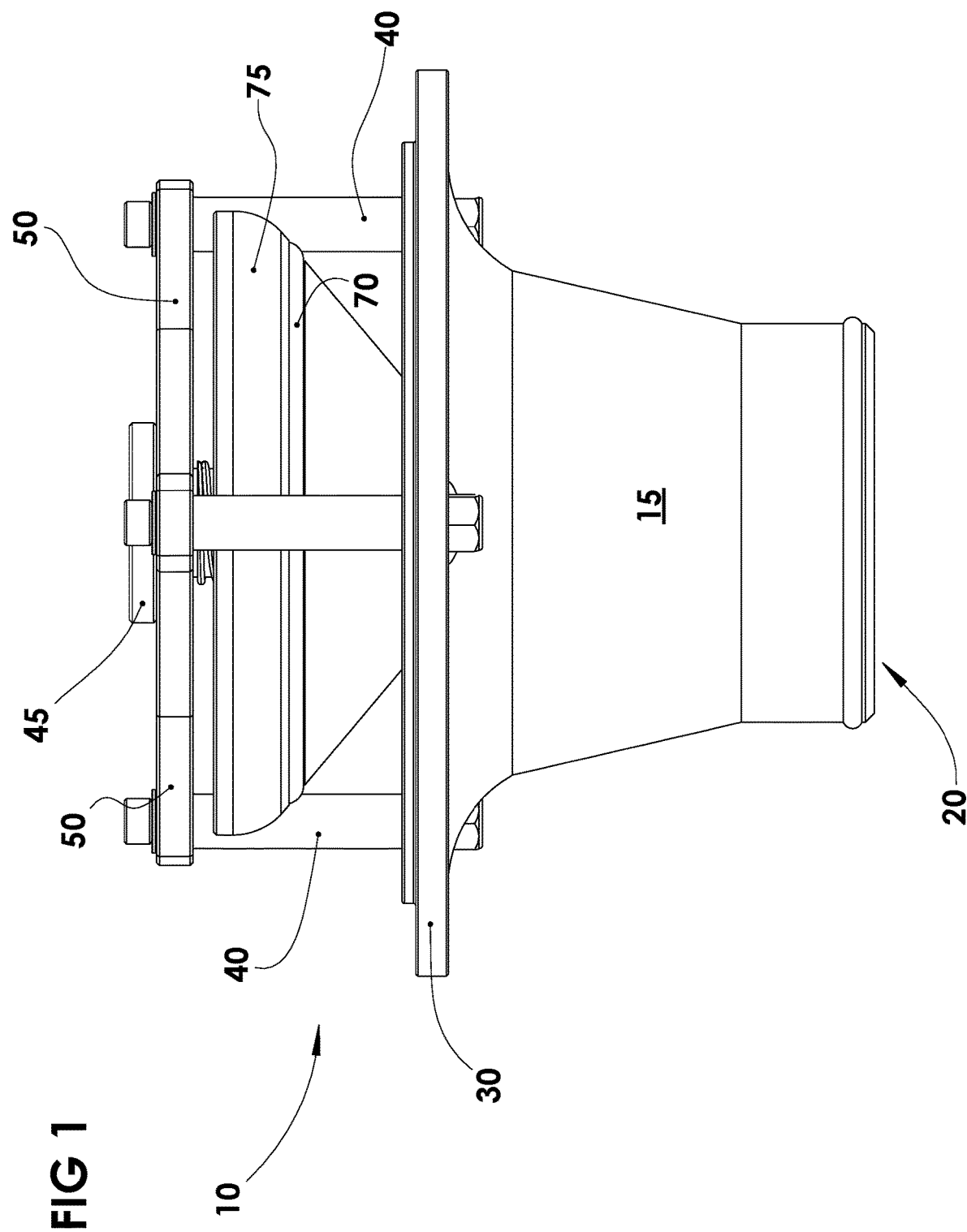
FIG. 1 is an elevation view of one embodiment of the valve apparatus embodying the principals of the invention.
Figure 2:
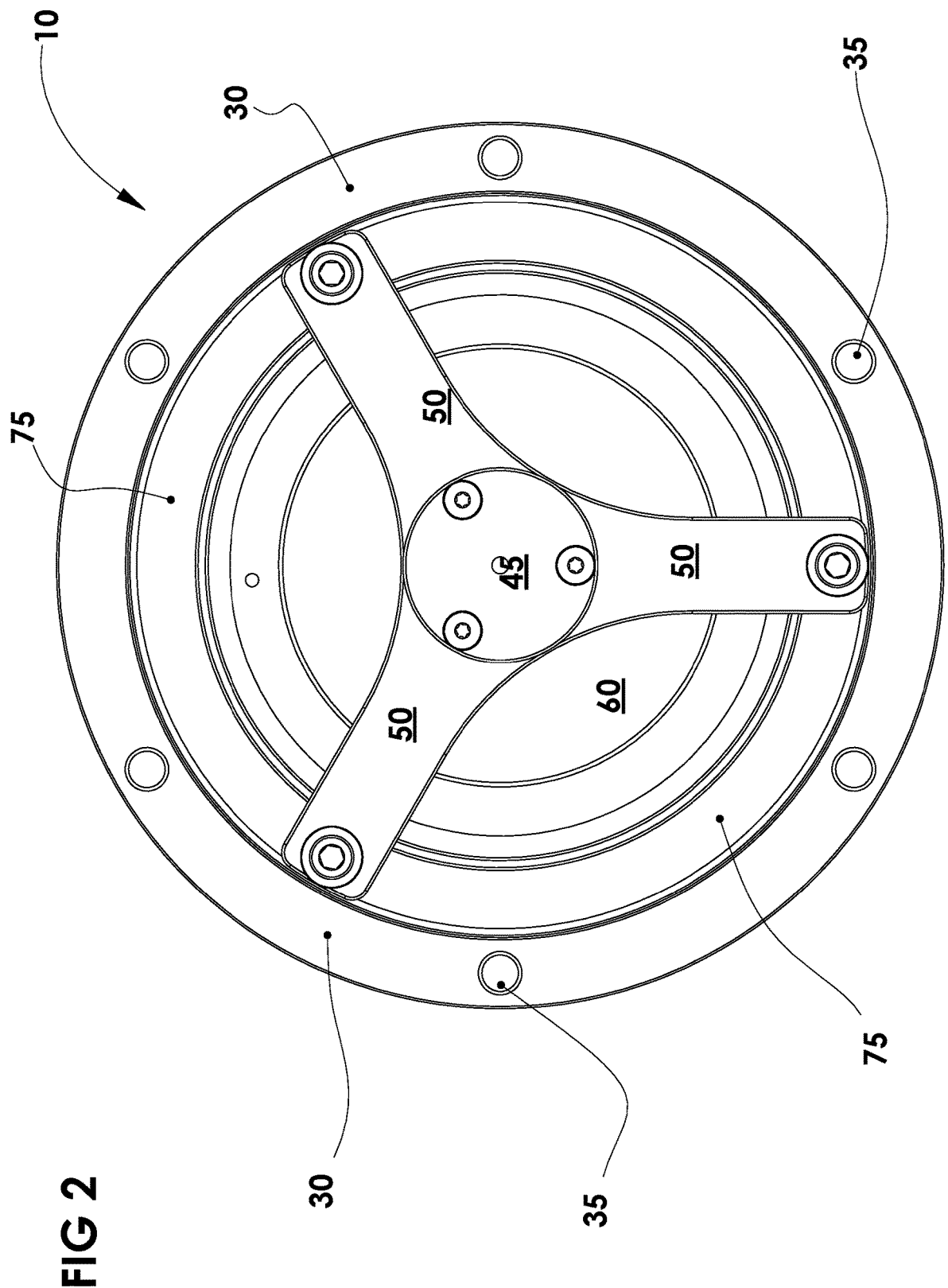
FIG. 2 is a plan view of the embodiment of FIG. 1.
Figure 3:
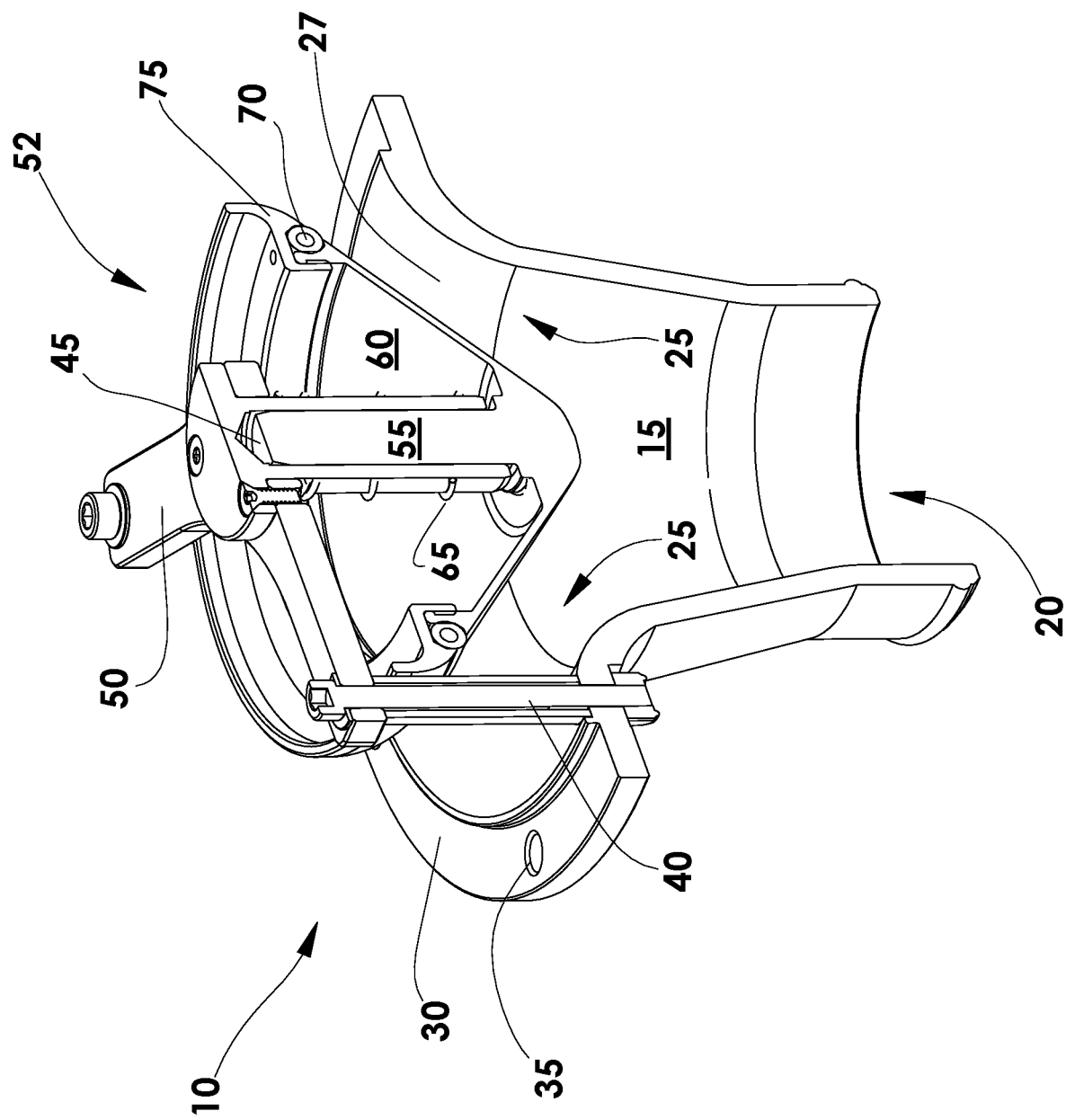
FIG. 3 is a sectional view of the embodiment of FIG. 1.

It will be recognized that some or all of the Figures are schematic representations for purposes of illustration and do not necessarily depict the actual relative sizes or locations of the elements shown. The Figures are provided for the purpose of illustrating one or more embodiments of the invention with the explicit understanding that they will not be used to limit the scope or the meaning of the claims.

DETAILED DESCRIPTION OF THE PREFERRED EMBODIMENTS

In the following description, for the purposes of explanation, numerous specific details are set forth in order to provide a thorough understanding of the valve apparatus and system ("VS") that embodies principals of the present invention. It will be apparent, however, to one skilled in the art that the valve apparatus and system may be practiced without some of these specific details. Throughout this description, the embodiments and examples shown should be considered as exemplars, rather than as limitations on the valve apparatus and system. That is, the following description provides examples, and the accompanying drawings show various examples for the purposes of illustration. However, these examples should not be construed in a limiting sense as they are merely intended to provide examples of the valve apparatus and system rather than to provide an exhaustive list of all possible implementations of the valve apparatus and system.

Specific embodiments of the valve apparatus and system invention will now be further described by the following, non-limiting examples which will serve to illustrate various features. The examples are intended merely to facilitate an understanding of ways in which the invention may be practiced and to further enable those of skill in the art to practice the invention. Accordingly, the examples should not be construed as limiting the scope of the invention. In addition, reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

The valve apparatus and system ("VS") of the present invention provides many novel and advantageous features. The VS can be used as a check valve or a pressure relief valve. That is, the VS can either be employed to increase the pressure in a system, or to decrease the pressure in a system. One feature of the VS is that instead of sliding or rocking over a seat to uncover an inlet or outlet port, the VS lifts from the seat with a movement perpendicular to the plane of the port. Therefore, no lubrication is required, and wear is kept to a minimum. In addition, because the VS does not require lubricants, it can operate at extremely hot or cold temperatures, that may range from 400 degrees to −70 degrees Fahrenheit.

As defined herein, "fluid" refers to fluid in the form of a gas, such as air from the atmosphere, or isolated gasses, such as hydrogen, helium, carbon dioxide or other gasses. The VS may be employed in any fluid system.

Referring now to FIGS. 1-5, a valve apparatus or system 10 is illustrated. A housing, or body 15 includes a fluid inlet 20 and a fluid outlet 25. In the illustrated embodiment, the body 15 has a circular cross-section, but it will be appreciated that an oval, elliptical or other cross-section may be employed. The outlet 25 includes a mounting flange 30 containing mounting apertures 35 for attaching the VS 10 to a desired apparatus. Adjacent to the mounting flange, sealing region 27 comprises a curved section of the body 15 that is contacted by portions of the diaphragm assembly, as discussed below.

Figure 4:
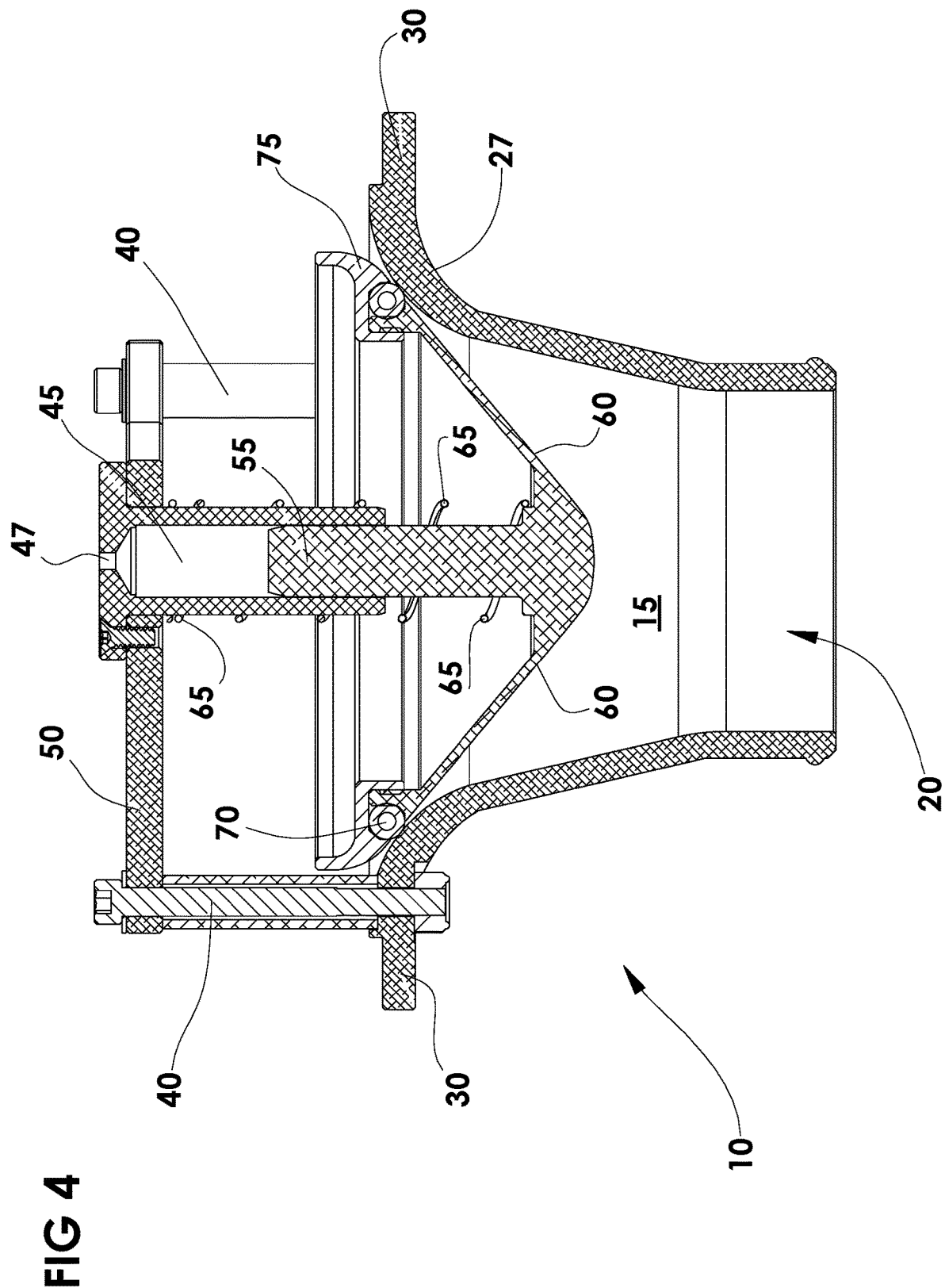
FIG. 4 is a sectional view of the embodiment of FIG. 1, with the valve apparatus in the closed position.

Attached between the mounting flange 30 and the outlet 25 is the support assembly that includes three struts 40 and a positioning chamber, or guide cylinder 45 that is attached to the struts 40 by locating member 50. FIG. 4 illustrates the guide cylinder 45, which comprises a cylinder, or tube with an open end, and a closed top section that attaches to the locating member 50. In an alternative embodiment, the top section may include a vent 47 that allows the passage of air into and out of the guide cylinder 45.

As shown in the FIGS. 1-5, a diaphragm assembly 52 is moveably coupled to the guide cylinder 45. The diaphragm assembly 52 comprises an elongated member or piston 55 having a distal end slideably mounted in the guide cylinder 45. The diaphragm assembly 52 also includes a diaphragm 60 located opposite the distal end of the piston 55, and a sealing element 70, and locking ring 75. Illustrated in FIG. 3, the diaphragm 60 is cone-shaped, but it will be appreciated that other shapes may be employed. For example, the diaphragm 60 may be substantially flat, or planar, or the diaphragm 60 may comprise a half-sphere, or it may be V-shaped.

Referring now to FIG. 4, a biasing element or spring 65 is coiled about the outer wall of the guide cylinder 45, with one end of the spring 65 abutting the lower surface of the locating member 50, and the other end of the spring 65 abutting the diaphragm 60.

Figure 6:
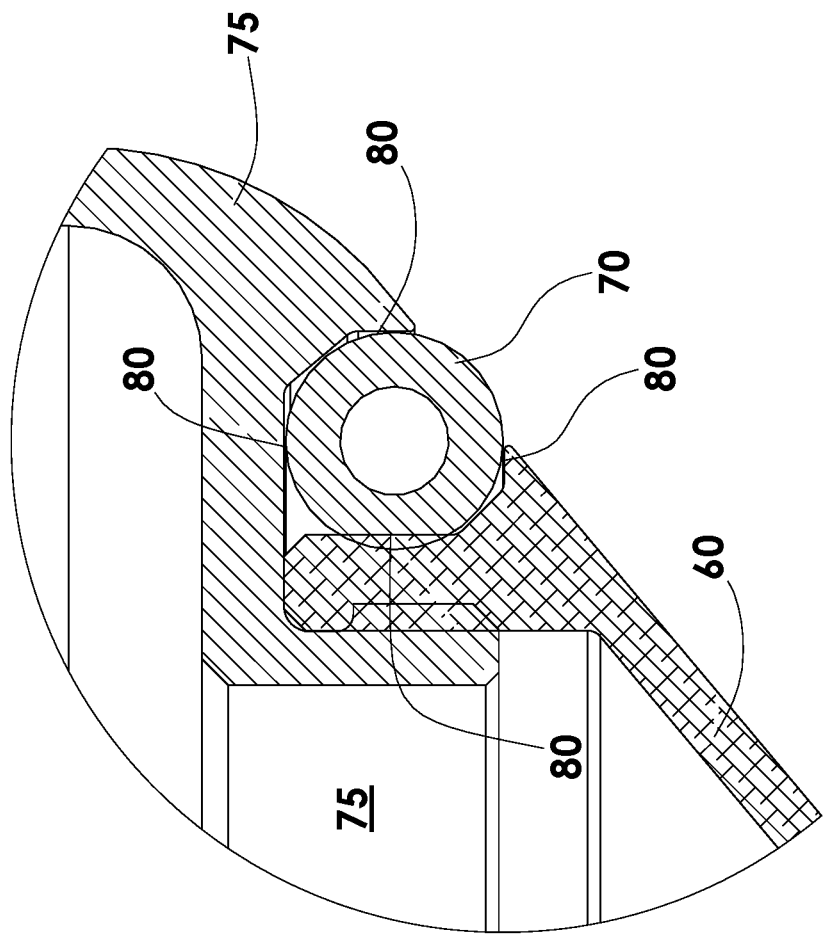
FIG. 6 is a close-up sectional view of the O-ring and associated elements as used on the embodiment of FIG. 1.

The sealing element, or O-ring 70, is shown in detail in FIG. 6. In a preferred embodiment, the sealing element 70 is a tubular "O-ring," but it will be appreciated that other elements may be employed, such as a deflectable skirt, or other arrangements. The upper portion of the diaphragm assembly 52 comprises a locking ring 75 that, in conjunction with the diaphragm 60, securely retains the sealing element 70.

Referring again to FIG. 6, the locking ring 75 and the diaphragm 60 include several contact surfaces 80 that secure the sealing element 70. The contact surfaces 80 are arranged more than 180 degrees around the sealing element 70, thereby securely positioning the sealing element 70. In a preferred embodiment, the sealing element 70 is hollow, and comprised of a silicone material. The combination of silicone with a hollow interior allows the sealing element 70 to remain deformable across an extreme temperature range, for example, from 400 to −70 degrees Fahrenheit. The sealing element 70 has superior sealing and vibration dampening qualities. That is, under compression (i.e., contact with the sealing region 27, as shown in FIG. 4), the hollow cross-section of the sealing element 70 may compress. By compressing, or deforming upon contact with the sealing region 27, the sealing element 70 ensures a fluid-tight seal even if the sealing region 27 includes surface imperfections. The hollow shape also distributes compressive strain and absorbs vibration.

The sealing element 70 is fabricated by joining the two ends of a silicone tube using a silicone adhesive that is cured through a room-temperature cure or a heat cycle. This allows the joint to retain the same deformable characteristics. It will be appreciated that the sealing element 70 may be constructed of other materials, such as plastics, polymers, polyesters, polyolefins, polycarbonates, polyamides, polyethers, polyethylene, polytetrafluoroethylene, silicone rubber, rubber, polyurethane, nylon and latex rubber. Other embodiments of the sealing element 70 may comprise an O-ring made without a joint, or an O-ring that is not hollow (i.e., having a solid cross-section).

The VS 10 may be used as a check valve, one-way valve or a pressure relief valve. Generally, a check valve is used to prevent any back flow, or leakage, and is used to increase pressure in a vessel or system by allowing fluid into the vessel. A pressure relief valve is used to control or limit the pressure in a system or vessel. The pressure is relieved by allowing the pressurized fluid to flow out of the system.

When the VS 10 used as a check valve, the inlet 20 may be coupled to a centrifugal compressor or other device that provides air, or other fluid. Coupled to the mounting flange 30 via fasteners positioned in the mounting apertures 35, may be any enclosed volume, such as a balloon, or other pressure vessel. For example, the VS 10 may be installed on a balloon, and used as part of a system that pumps air into the balloon. In this embodiment, the inlet 20 is coupled to a centrifugal compressor (not shown) that compresses the air. The spring 65, pushing against the diaphragm 60, keeps the sealing element 70 in contact with the sealing region 27, as shown in FIG. 4. When the fluid pressure pushing against the diaphragm 60 exceeds the force, or preload applied by the spring 65, the diaphragm assembly 52 opens, or retracts, with the piston 55 moving into guide cylinder 45, so that sealing element 70 no longer contacts the sealing region 27. This opens the VS 10, as shown in FIG. 5, allowing air to pass into the balloon via the outlet 25.

The force or pressure required to compress the spring 65, and thus "open" the VS 10, allowing air to pass past the diaphragm 60 may be adjusted by changing the spring rate or preload of the spring 65. "Closing" the VS 10 (i.e., the sealing element 70 contacts the sealing region 27) occurs when the centrifugal compressor shuts off. In addition, pressure within pressure vessel will push against the diaphragm 60 and locking ring 75 providing additional force to keep the sealing element 70 in contact with the sealing region 27.

One feature of the VS 10 is that the piston 55 and guide cylinder 45 are sized to have an "precision fit." That is, the clearance between the piston 55 and the guide cylinder 45 may generally range from 0.002 to 0.020 of an inch. As the piston 55 moves within the guide cylinder 45, air is either drawn into the guide cylinder 45 or forced out. But, due to the selected clearance between the piston 55 and the guide cylinder 45, the air cannot move freely, but instead moves at a controlled rate, thereby acting as a dampening force. Specifically, the tight fit between the piston 55 and the guide cylinder 45 restricts the passage of air into and out of the guide cylinder 45, which controls movement of the piston 55 relative to the guide cylinder 45. This restriction of movement acts to dampen any spring 65 oscillations during operation of the VS 10. Another embodiment of the present invention may eliminate the spring 65 and replace it with an electromechanical device, such as a solenoid or other actuator. Also, the piston 55 and/or guide cylinder 45 may have a surface coating to minimize friction and wear.

Figure 5:
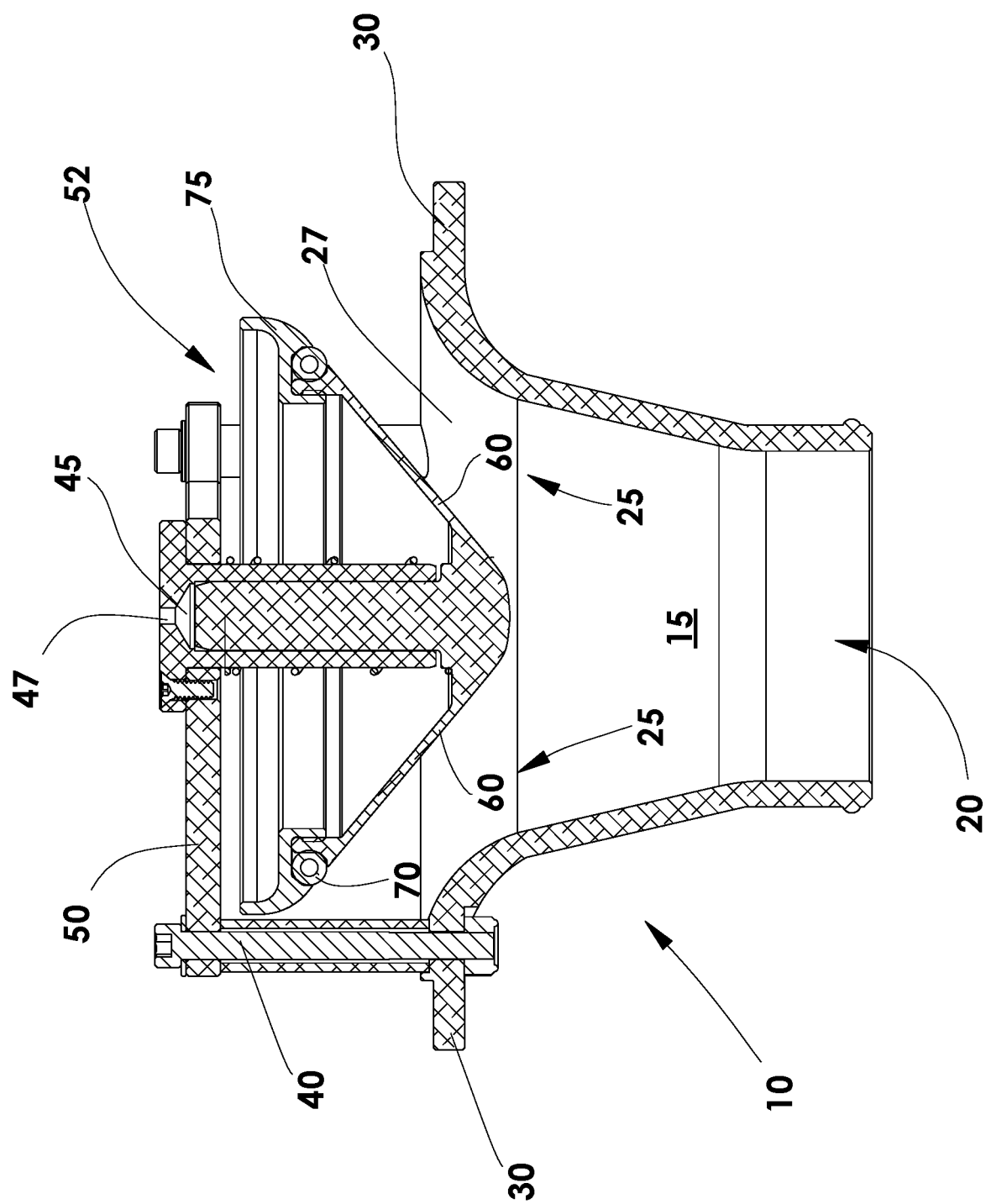
FIG. 5 is a sectional view of the embodiment of FIG. 1, with the valve apparatus in the open position.

In another embodiment, shown in FIGS. 4 and 5, a vent, or precision sized aperture 47 may be employed to aid in controlling the dampening effect. In yet another embodiment, a tube or hose (not shown) may be coupled to the vent 47 with the other end of the tube communicating with an air source to further control the opening, amplitude and closing speed of the VS 10. In this example, the tube may be coupled to the inlet 20 and include a valve (not shown) so that air pressure from the inlet 20 is used to control the movement of diaphragm assembly 52. In yet another embodiment, a tube (not shown) communicating with an air source that controls the opening, amplitude, and closing speed of the VS 10 with a valve (not shown) may employ a seal (not shown) positioned around the perimeter of the piston 55. In this embodiment, the outer diameter and other dimensions of the piston 55 may be altered.

Figure 7:
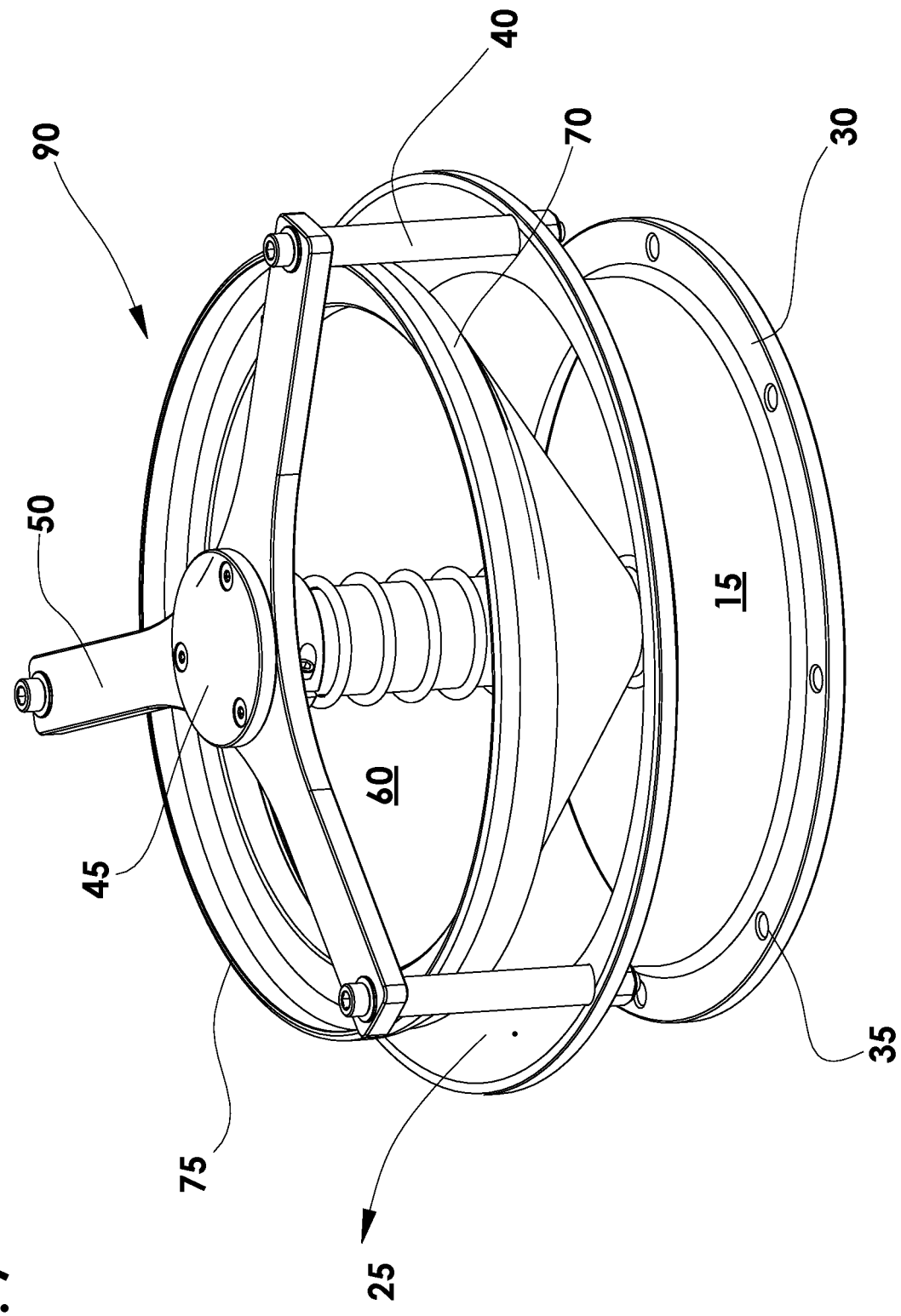
FIG. 7 is a perspective view of a second embodiment of the valve apparatus embodying the principals of the invention.

Referring now to FIG. 7, a pressure relief valve system, VS 90 is illustrated. In this embodiment of the present invention, the pressure relief valve system 90 is employed as a relief valve that is designed or set to open at a predetermined pressure to protect pressure vessels and other equipment from being subjected to pressures that exceed their design limits. When the set pressure is exceeded, the pressure relief valve system 90 becomes the "path of least resistance" as the pressure relief valve system 90 is forced open and a portion of the fluid is vented through the outlet 25. It will be appreciated that the VS 10 and 90 may be constructed of any size to fit any application. Other embodiments of the VS 10 and 90 may include a cover positioned over the top of diaphragm assembly 52. For example, a half-sphere, or "dome"-shaped cover may be placed over the diaphragm assembly 52. In this embodiment, the half-sphere, or "dome" would be employed to minimize turbulence as the fluid passes around the diaphragm assembly 52 during operation. It will be appreciated that other shapes may also be employed to "smooth" the flow of fluid as it passes about the diaphragm assembly 52.

As shown in FIG. 7, the VS 90 includes many of the elements found in the VS 10, but the VS 90 is mounted in an opposite orientation as compared to the VS 10. That is, the mounting flange 30 and mounting apertures 35 are arranged so that the outlet 25 is positioned to allow fluid to escape from a pressure vessel. In this arrangement, the length of the body 15 may be truncated so that the inlet 20 is substantially at the same plane as the mounting flange 30. Also, the diameter, or size of all the components may be scaled to a different size than those of the VS 10. For example, the diaphragm assembly 52 may have a larger diameter, including the locking ring 75 and the sealing element 70. To accommodate the increased force exerted on the larger area diaphragm 60, the spring (not shown) rate, or preload may also be greater than found on the VS 10.

The valve system 10 and 90 may be used in virtually any industry that employs pressure vessels, such as aerospace, medical, oil/gas, cryogenics, automotive, chemical processing, agriculture, and other industries.

It is to be noticed that the term "comprising", used in the claims, should not be interpreted as being limitative to the means or elements listed thereafter. Thus, the scope of the expression "a device comprising elements A and B" should not be limited to devices consisting only of components A and B. It means that with respect to the present invention, the only relevant components of the device are A and B.

Similarly, it is to be noticed that the term "coupled", also used in the claims, may include a direct connection (for example, A is "part of" B). But, "coupled" should not be interpreted as being limitative to direct connections only. Thus, the scope of the expression "a device A coupled to a device B" should not be limited to devices or systems where device A is directly connected to device B. It means that there exists a path between A and B which may be a path including other devices, elements or means. Finally, the terms "a", "an" and "the" mean "one or more", unless expressly specified otherwise.

Thus, it is seen that a valve apparatus, system and method is provided. One skilled in the art will appreciate that the present invention can be practiced by other than the above-described embodiments, which are presented in this description for purposes of illustration and not of limitation. The specification and drawings are not intended to limit the exclusionary scope of this patent document. It is noted that various equivalents for the particular embodiments discussed in this description may practice the invention as well. That is, while the present invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims. The fact that a product, process or method exhibits differences from one or more of the above-described exemplary embodiments does not mean that the product or process is outside the scope (literal scope and/or other legally-recognized scope) of the following claims.

What is claimed is:

1. A valve apparatus, comprising:
   a housing having an inlet aperture and an outlet aperture, and a housing axis parallel to a housing centerline, with a perimeter of the outlet aperture comprising an increasing radius surface so that the housing terminates in a ring positioned perpendicular to the housing axis, the ring including an inset surface having a plurality of apertures;
   a support assembly coupled to the housing, the support assembly comprising a positioning chamber located downstream of the outlet aperture and at least two support elements extending from the housing, and positioned parallel to the housing axis;
   a diaphragm assembly moveably coupled to the support assembly, the diaphragm assembly comprising:
      an elongated member having a distal end slideably mounted in the positioning chamber;
      a diaphragm coupled to the elongated member, opposite the distal end;
      a deformable sealing element located about a perimeter of the diaphragm, the deformable sealing element comprising a hollow internally non-pressurized O-ring; and
   a biasing element arranged to contact the support assembly and the diaphragm assembly, thereby urging at least a portion of the sealing element against the outlet aperture;
   where the diaphragm further comprises:
   a cone-shaped member having a non-concave surface with the elongated member extending therefrom; and
   a ring element coupled to a perimeter of the substantially cone-shaped member;
   where the sealing element is captured between the ring element and the substantially cone-shaped member, so that when the sealing element contacts the outlet aperture, all fluid flow through the valve apparatus is stopped, the valve apparatus providing no other means to allow fluid flow.

2. The valve apparatus of claim 1, where the biasing element comprises a coil spring.

3. The valve apparatus of claim 1, where the support assembly further comprises:

at least two struts coupled to the housing; and a chamber locating member coupled to the at least two struts and the positioning chamber, the chamber locating member structured to locate the positioning chamber over the outlet aperture.

4. The valve apparatus of claim 1, where the valve apparatus may be arranged to operate as a check valve or as a pressure relief valve.

5. A valve apparatus, comprising:

a valve body having an inlet aperture and an outlet aperture, and a valve body axis parallel to a valve body centerline, with a perimeter of the outlet aperture comprising an increasing radius surface so that the valve body terminates in a ring positioned perpendicular to the valve body axis, the ring including an inset surface having a plurality of apertures;

a diaphragm assembly moveably coupled to the valve body, the diaphragm assembly comprising:

a cone-shaped diaphragm having a non-concave surface and a sealing element, the sealing element comprising a hollow internally non-pressurized O-ring located about a perimeter of the diaphragm;

a ring element coupled to a perimeter of the substantially cone-shaped diaphragm;

where the hollow internally non-pressurized O-ring is captured between the ring element and the substantially cone-shaped diaphragm; and a piston coupled to the cone-shaped diaphragm; and a support element coupled to the valve body by at least two struts extending from the valve body, with the at least two struts positioned parallel to the valve body axis downstream of the outlet aperture, the support element comprising a cylinder, with the cylinder located downstream of the outlet aperture, and the piston slideably mounted in the cylinder, so that at least a portion of the sealing element contacts the outlet aperture, thereby stopping all fluid flow through the valve apparatus, the valve apparatus providing no other means to allow fluid flow.

6. The valve apparatus of claim 5, further comprising:

a biasing element positioned about an exterior of the cylinder, the biasing element structured to position at least a portion of the sealing element against the outlet aperture.

7. The valve apparatus of claim 6, where the biasing element comprises a coil spring, with the spring positioned around the exterior of the cylinder, and extending from the support element to the cone-shaped diaphragm.

8. The valve apparatus of claim 5, where the support element further comprises:

a cylinder locating member coupled to the at least two struts and the cylinder, the cylinder locating member structured to position the cylinder downstream of the outlet aperture.

9. The valve apparatus of claim 5, where the valve apparatus may be arranged to operate as a check valve or as a pressure relief valve.

10. A method of changing a pressure in a pressurized system, the method comprising the steps of:

providing a housing that includes an inlet and an outlet to the pressurized system, with a housing axis parallel to a housing centerline, with a perimeter of the housing comprising an increasing radius surface so that the housing terminates in a ring positioned perpendicular to the housing axis, the ring including an insert surface having a plurality of apertures;

providing a support assembly coupled to the housing by at least two struts extending from the housing, and positioned parallel to the housing axis downstream of the outlet, the support assembly comprising a positioning chamber located downstream of the outlet;

a diaphragm assembly moveably coupled to the support assembly, the diaphragm assembly comprising:

an elongated member having a distal end slideably mounted in the positioning chamber;

a cone-shaped diaphragm having a non-concave surface coupled to the elongated member, opposite the distal end;

a sealing element located about a perimeter of the diaphragm, the sealing element comprising a hollow internally non-pressurized O-ring located about a perimeter of the substantially cone-shaped diaphragm;

a ring element coupled to a perimeter of the substantially cone-shaped diaphragm;

where the hollow internally non-pressurized O-ring is captured between the ring element and the substantially cone-shaped diaphragm; and a biasing element arranged to contact the support assembly and the diaphragm assembly, thereby urging at least a portion of the sealing element against the outlet;

supplying a pressure to the housing, the pressure acting on the diaphragm so that the biasing element is deflected, so that the sealing element moves away from the housing, allowing a change in pressure in the pressurized system, with no other means to provide a change in pressure.

11. The method of claim 10, where the change in pressure in the pressurized system may be an increase or a decrease in pressure.

* * * * *